United States Patent
Lin

(10) Patent No.: US 11,435,262 B2
(45) Date of Patent: Sep. 6, 2022

(54) METHOD FOR ASSESSING PRELOAD DEGRADATION OF BALL SCREW

(71) Applicant: HIWIN TECHNOLOGIES CORP., Taichung (TW)

(72) Inventor: Yu-Hsin Lin, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 170 days.

(21) Appl. No.: 17/013,999

(22) Filed: Sep. 8, 2020

(65) Prior Publication Data
US 2022/0074811 A1    Mar. 10, 2022

(51) Int. Cl.
*G01M 13/00*    (2019.01)

(52) U.S. Cl.
CPC .................................. *G01M 13/00* (2013.01)

(58) Field of Classification Search
None
See application file for complete search history.

(56) References Cited

U.S. PATENT DOCUMENTS

| | | | |
|---|---|---|---|
| 7,680,565 B2 | 3/2010 | Balasu et al. | |
| 2011/0106510 A1* | 5/2011 | Poon | G05B 23/0254 703/2 |
| 2016/0017914 A1* | 1/2016 | Vissers | F16C 25/06 29/898.09 |
| 2018/0321194 A1* | 11/2018 | Cheng | G01N 29/14 |
| 2021/0181047 A1* | 6/2021 | Hubert | G01L 5/0009 |

FOREIGN PATENT DOCUMENTS

| | | | |
|---|---|---|---|
| JP | 2001349407 A | * | 12/2001 |
| JP | 2008097361 A | | 4/2008 |
| JP | 2009257806 A | * | 11/2009 |
| JP | 2019535957 A | | 12/2019 |
| KR | 102081502 B1 | | 2/2020 |
| WO | 2020090479 A1 | | 5/2020 |

OTHER PUBLICATIONS

Feng Yi Jun et al., KR 102081502 B1, IDS record, translation (Year: 2020).*
Office Action for counterpart German Application No. 102020211499.4, dated Apr. 26, 2021 by the DPMA.
(Continued)

*Primary Examiner* — Lina M Cordero
(74) *Attorney, Agent, or Firm* — Rosenberg, Klein & Lee

(57) ABSTRACT

A method for assessing preload degradation of a ball screw is to be implemented by a computer device. The method includes: obtaining an entry of time-domain vibration data based on a vibration signal which is related to vibrations of balls of the ball screw; obtaining an entry of frequency-domain vibration derived data based on the time-domain vibration data; obtaining a vibration eigenvector based on the entry of frequency-domain vibration derived data; performing preload assessment based on the vibration eigenvector, reference vibration vectors and a preload assessment range to obtain a result of the preload assessment; and determining whether preload degradation has occurred on the ball screw based on the result of the preload assessment.

10 Claims, 8 Drawing Sheets

(56) References Cited

OTHER PUBLICATIONS

Klein. "Schwingungsdiagnostische Beurteilung von Maschinen und Anlagen [Vibration Diagnostic Assessment of Machines and Systems]." 2d ed., Stahleisen (Düsseldorf), 2000. pp. 25-50, 69-88, 153-169. ISBN 3-514-00663-6.
"Unsupervised learning," Wikipedia, https://en.wikipedia.org/wiki/Unsupervised_learning (accessed Jul. 22, 2021).
"Self-organizing map," Wikipedia, https://en.wikipedia.org/wiki/Self-organizing_map (accessed Jul. 22, 2021).

* cited by examiner

METHOD FOR ASSESSING PRELOAD DEGRADATION OF BALL SCREW

FIELD

The disclosure relates to a method for assessing preload degradation, and more particularly to a method for assessing preload degradation of a ball screw.

BACKGROUND

Due to advantages of high precision motion, ball screws are widely used as transmission components in tool machines that require relatively high positioning precision. Generally, a ball screw includes a plurality of balls, a nut and a screw shaft. The nut engages the screw shaft through the balls to thereby perform linear movement relative to the screw shaft.

Most ball screws are preloaded to eliminate backlash between input (i.e., rotation) and output (i.e., linear movement). Insufficient preload may lead to undesirable vibration when the ball screw is in motion. Moreover, the preload of ball screws decreases gradually over a period of use, eventually to an extent that backlash occurs. The undesirable vibration and backlash may consequently shorten the service life and reduce the precision of ball screws.

Taiwanese Invention Patent No. I653410B discloses a method for determining whether backlash is formed in a ball screw based on a result of determination as to whether preload of the ball screw exists. Backlash is determined to be formed when it is determined that preload of the ball screw no longer exists. However, such method is not suitable for determining whether preload degradation has occurred when backlash has not yet been formed.

SUMMARY

Therefore, an object of the disclosure is to provide a method for assessing preload degradation of a ball screw that can alleviate at least the drawback of the prior art.

According to the disclosure, the method is adapted to be implemented by a computer device. The ball screw includes a nut, a plurality of balls, and a return mechanism for recirculating the balls. The computer device is in signal connection with a first sensor that is mounted on the nut, that is adjacent to the return mechanism, and that periodically transmits to the computer device a vibration signal which is related to vibrations of the balls in the return mechanism. The method includes steps of:

A) obtaining an entry of time-domain vibration data based on the vibration signal received from the first sensor;

B) obtaining at least one entry of frequency-domain vibration derived data based on the entry of time-domain vibration data;

C) for each of the at least one entry of frequency-domain vibration derived data, obtaining a vibration eigenvector based on the entry of frequency-domain vibration derived data;

D) performing preload assessment based on a plurality of reference vibration vectors, a preload assessment range, and the vibration eigenvector(s) obtained for the at least one entry of frequency-domain vibration derived data, so as to obtain a result of the preload assessment; and E) determining whether preload degradation has occurred on the ball screw based on the result of the preload assessment.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
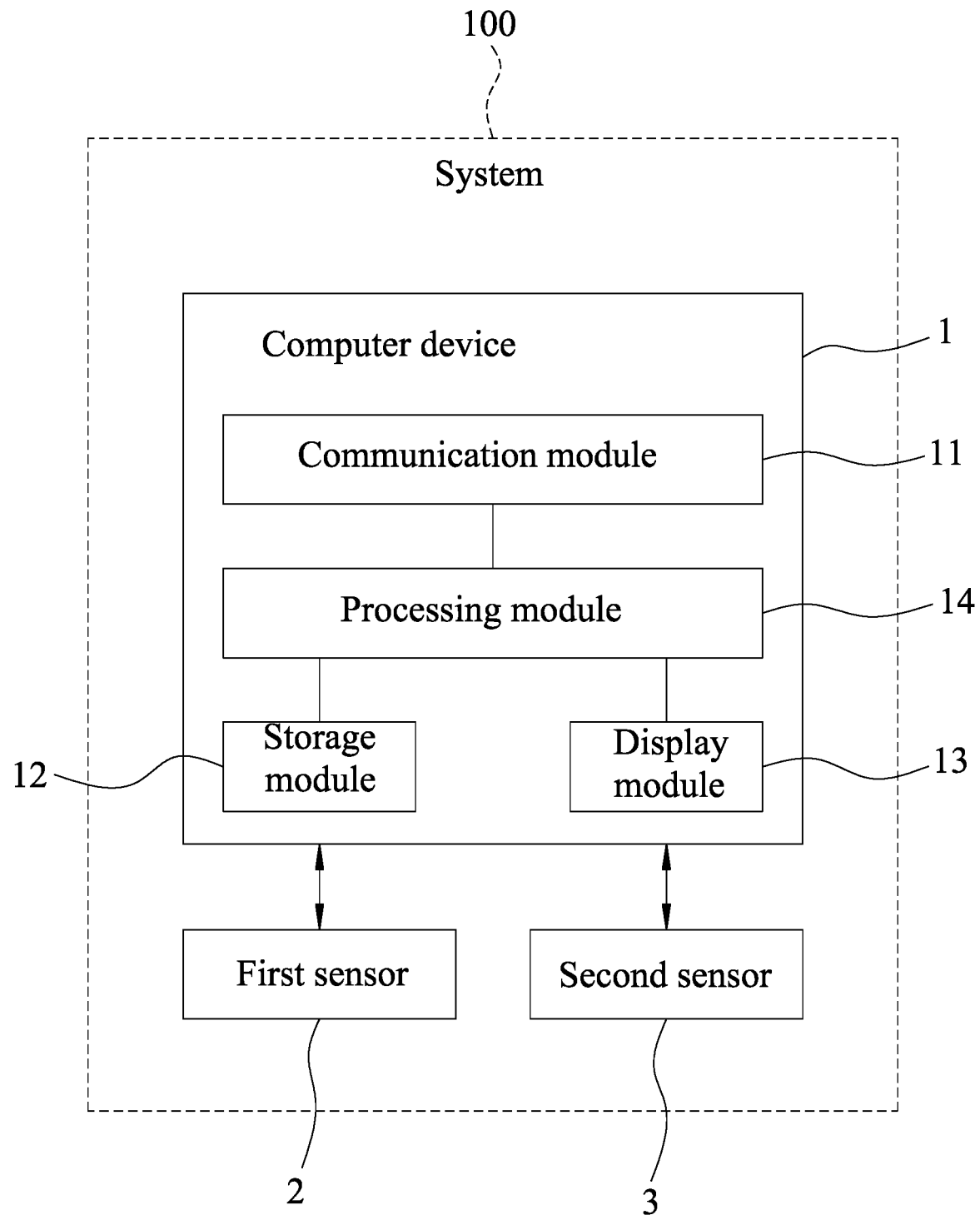
FIG. 1 is a block diagram illustrating an embodiment of a system that is utilized to implement a method for assessing preload degradation of a ball screw according to the disclosure.
Figure 2:
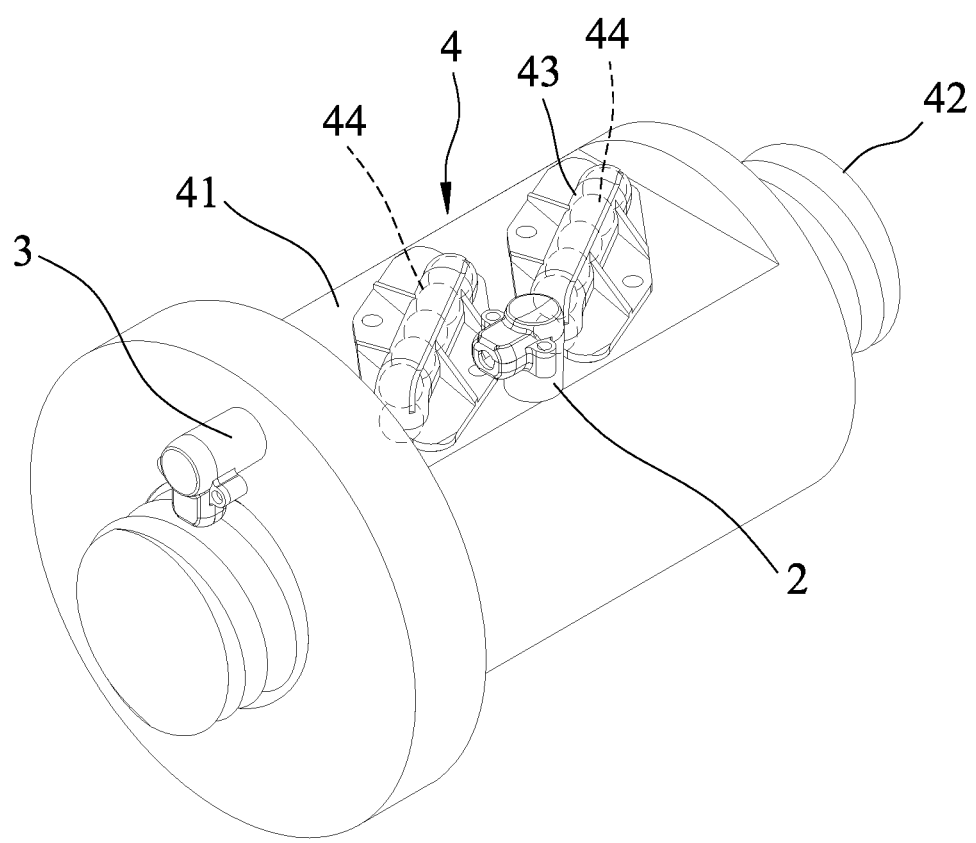
FIG. 2 is a perspective view illustrating an embodiment where a first sensor and a second sensor of the system are mounted on the ball screw.

Referring to FIGS. 1 and 2, an embodiment of a method for assessing preload degradation of a ball screw 4 according to the disclosure is adapted to be implemented by a system 100 shown in FIG. 1. The system 100 includes a computer device 1, a first sensor 2 and a second sensor 3. The ball screw 4 includes a nut 41, a screw shaft 42, a plurality of balls 44, and a return mechanism 43 for recirculating the balls 44. The computer device 1 is in signal connection with the first sensor 2 and the second sensor 3.

In this embodiment, each of the first sensor 2 and the second sensor 3 may be implemented by an accelerometer, but implementation thereof is not limited to what is disclosed herein, and each sensor may be implemented by a displacement meter or a velocimeter in other embodiments. More specifically, an effective bandwidth of the first sensor 2 covers a frequency ranging from 0.1 Hz to 5 Hz; an effective bandwidth of the second sensor 3 covers a frequency range (e.g., 0.1 Hz to 250 Hz) that is within ten times a bandwidth of a spin frequency of the screw shaft 42, and the second sensor 3 features 20 bit digital resolution.

In this embodiment, the ball screw 4 is an external circulation ball screw as shown in FIG. 2, and the return mechanism 43 includes a return tube.

The first sensor 2 is mounted on the nut 41, and is adjacent to the return mechanism 43. The first sensor 2 periodically transmits to the computer device 1 a vibration signal which is related to vibrations of the balls 44 in the return mechanism 43. The second sensor 3 is mounted on the nut 41, and periodically transmits to the computer device 1 an inertial-force signal which is related to an inertial force exerted on the nut 41 along a direction in which the nut 41 is being moved relative to the screw shaft 42.

It is worth to note that for a ball screw having a structure different from that of the external circulation ball screw 4 described herein, the first sensor 2 and the second sensor 3 may be respectively mounted on appropriate positions (may be the same position or different positions) on the ball screw so as to respectively obtain the vibration signal and the inertial-force signal.

In this embodiment, the computer device 1 may be implemented to be a personal computer, a laptop computer, a notebook computer, a tablet computer, a computing server or a cloud server, but implementation thereof is not limited to what are disclosed herein and may vary in other embodiments.

The computer device 1 includes a storage module 12, a display module 13, a communication module 11 that is signally connected to the first sensor 2 and the second sensor 3, and a processing module 14 that is electrically connected to the communication module 11, the storage module 12 and the display module 13.

The communication module 11 is implemented to be a network interface controller or a wireless transceiver that supports wired communication standards and/or wireless communication standards (such as Bluetooth technology standards or cellular network technology standards), but is not limited thereto.

The storage module 12 may be implemented by flash memory, a hard disk drive (HDD), a solid state disk (SSD), electrically-erasable programmable read-only memory (EEPROM), or any other non-volatile memory devices, but is not limited thereto.

The display module 13 may be a liquid-crystal display (LCD), a light-emitting diode (LED) display, a plasma display panel, a projection display or the like. However, implementation of the display module 13 is not limited to the disclosure herein and may vary in other embodiments.

The processing module 14 may be implemented by a processor, a central processing unit (CPU), a microprocessor, a micro control unit (MCU), a system on a chip (SoC), or any circuit configurable/programmable in a software manner and/or hardware manner to implement functionalities discussed in this disclosure.

The storage module 12 of the computer device 1 stores a plurality of first training vibration eigenvectors, a plurality of second training vibration eigenvectors, a plurality of first training inertial-force eigenvectors and a plurality of second training inertial-force eigenvectors.

Each of the first training vibration eigenvectors (or each of the second training vibration eigenvectors) includes one of a training kurtosis eigenvector that indicates kurtosis of an entry of frequency-domain data to which the first training vibration eigenvector (or the second training vibration eigenvector) corresponds, a training maximum-peak-value eigenvector that indicates a maximum peak value of the entry of frequency-domain data, a training total-energy eigenvector that indicates total energy of the entry of frequency-domain data, and any combination thereof.

Each of the first training inertial-force eigenvectors (or each of the second training inertial-force eigenvectors) includes one of a training peak-to-peak eigenvector that indicates a peak-to-peak value of an entry of time-domain data to which the first training inertial-force eigenvector (or the second training inertial-force eigenvector) corresponds, a training maximum-peak-value eigenvector that indicates a maximum peak value of the entry of time-domain data, a training average-peak-value eigenvector that indicates an average peak value, which is an average of an absolute value of a positive maximum peak value and an absolute value of a minimum peak value of the entry of time-domain data, and any combination thereof.

It should be noted that implementations of the first and second training vibration eigenvectors, and the first and second training inertial-force eigenvectors are not limited to the disclosure herein and may vary in other embodiments.

Figure 4:
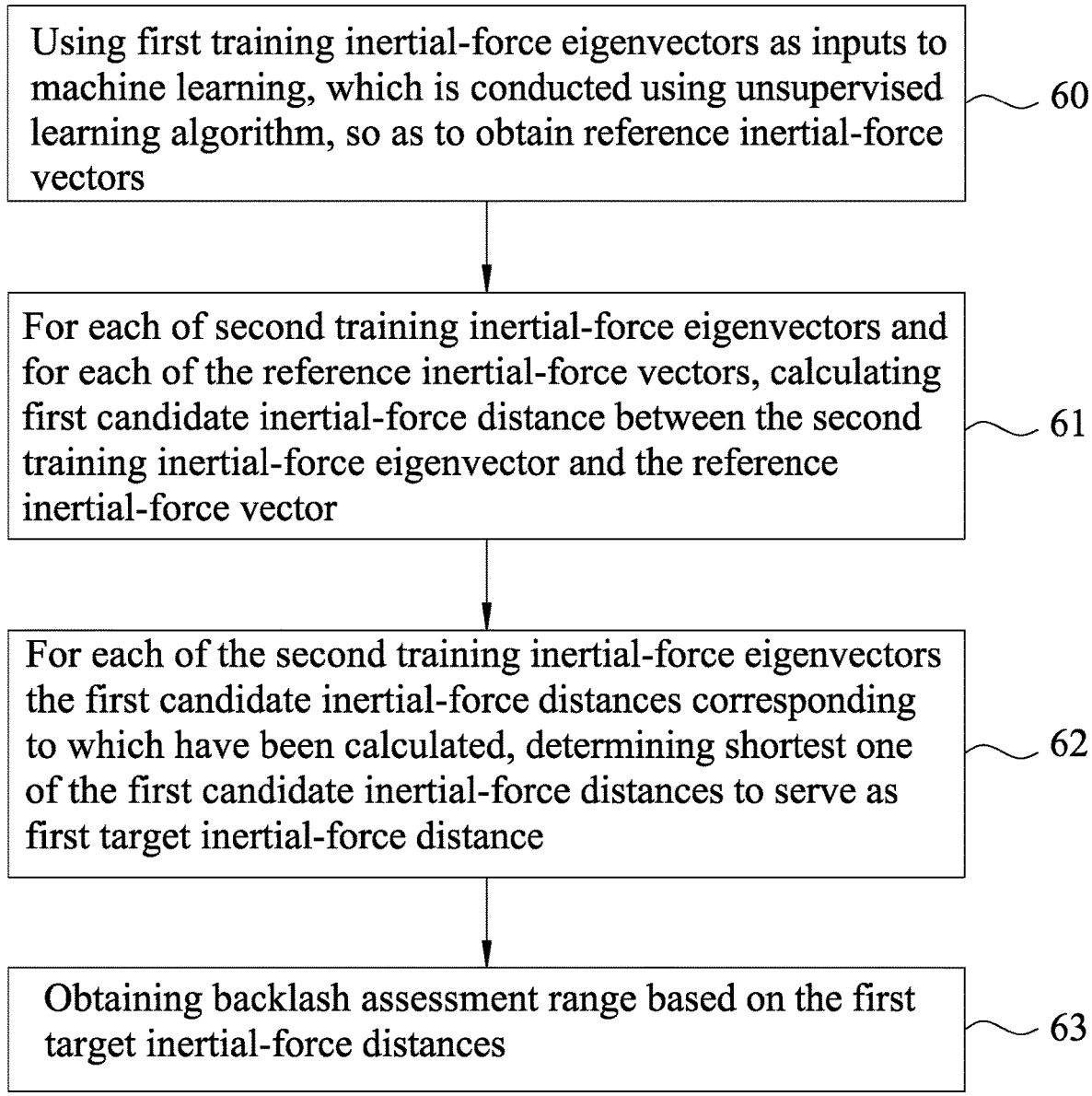
FIG. 4 is a flow chart illustrating an embodiment of a training procedure for backlash detection in the method according to the disclosure.
Figure 5:
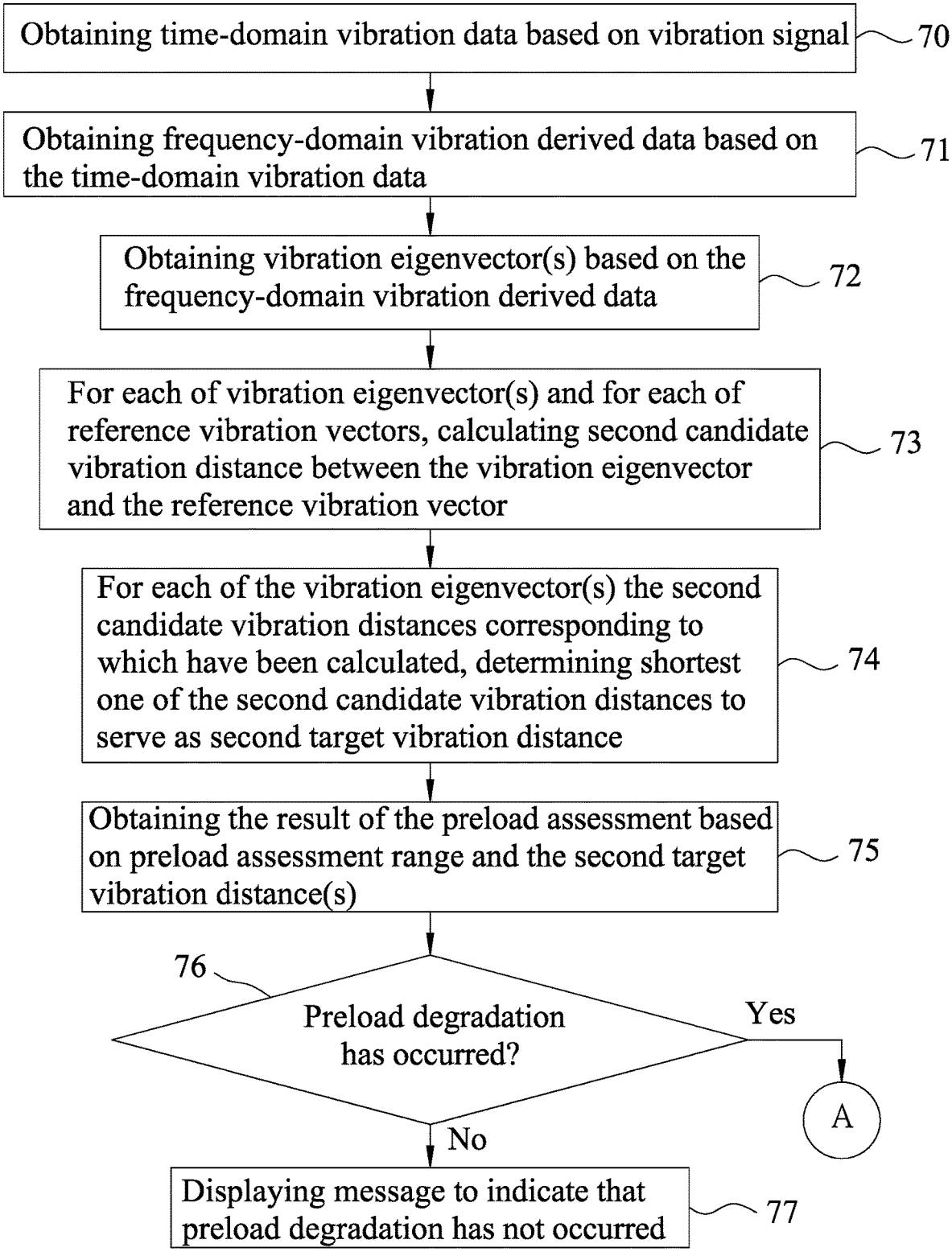
FIGS. 5 and 6 are flow charts cooperatively illustrating an embodiment of an assessment procedure for preload degradation and backlash in the method according to the disclosure.
Figure 6:
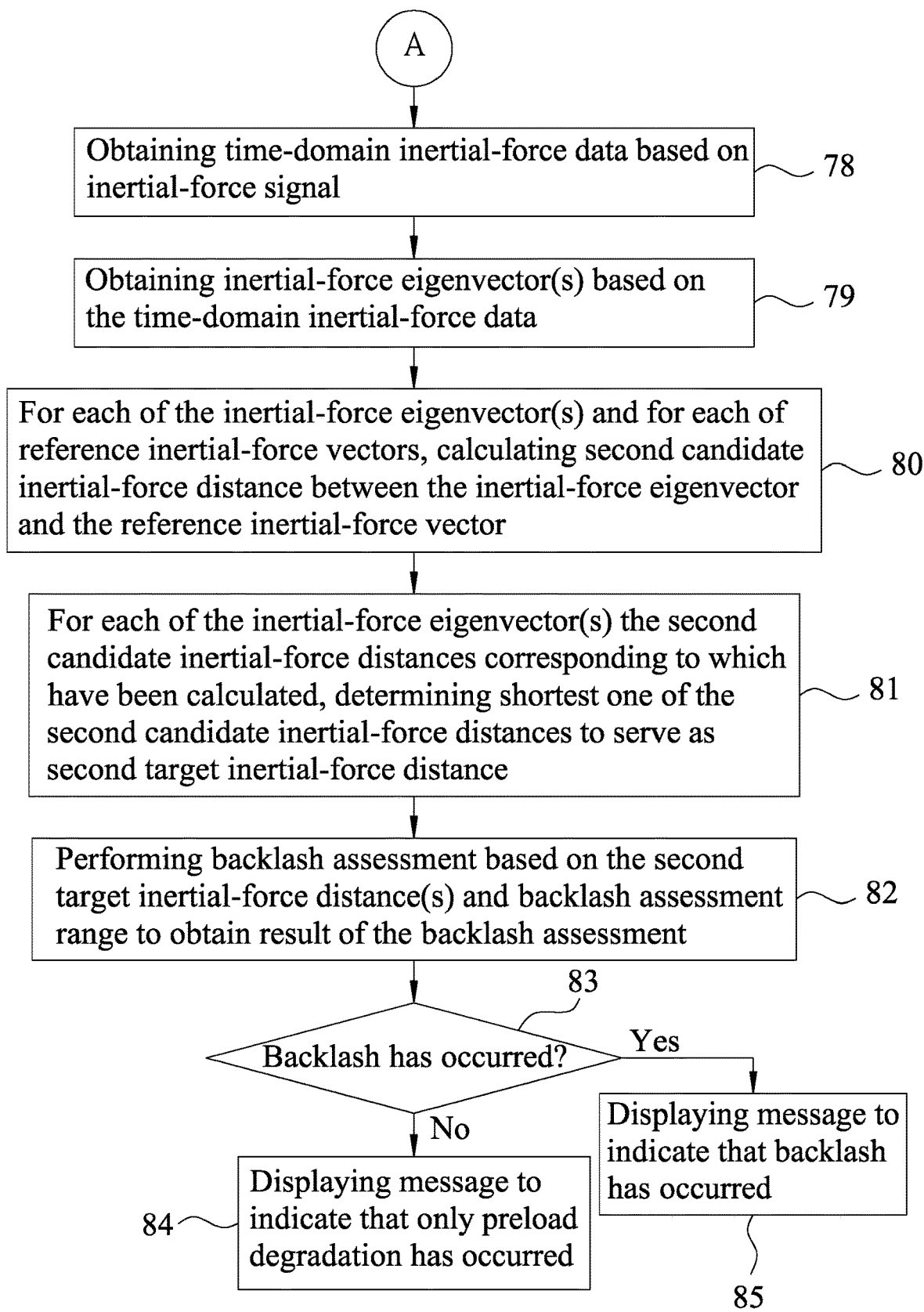

The method for assessing preload degradation of the ball screw 4 according to the disclosure includes a training procedure for preload degradation detection (see FIG. 3), a training procedure for backlash detection (see FIG. 4), and an assessment procedure for preload degradation and backlash (see FIGS. 5 and 6).

Figure 3:
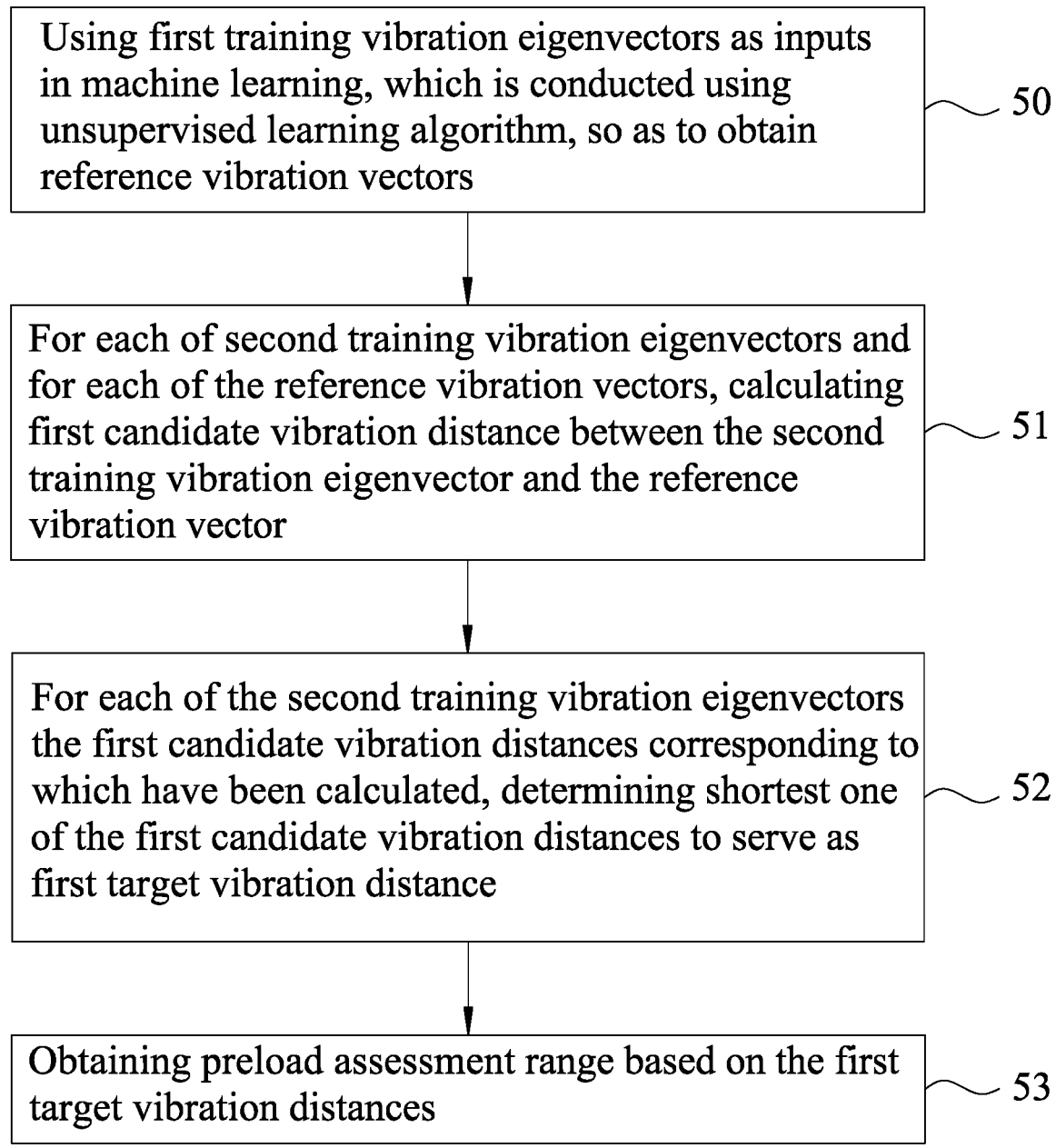
FIG. 3 is a flow chart illustrating an embodiment of a training procedure for preload degradation detection in the method according to the disclosure.

Referring to FIG. 1 and FIG. 3, the training procedure of preload degradation detection includes steps 50 to 53 explained below.

In step 50, the processing module 14 of the computer device 1 uses the first training vibration eigenvectors as inputs in machine learning, which is conducted using an unsupervised learning algorithm, so as to obtain reference vibration vectors that are in a data space spanned by the first training vibration eigenvectors.

The unsupervised learning algorithm may include a clustering algorithm (e.g., K-means clustering) and/or an algorithm of self-organizing map (SOM).

In a scenario where the unsupervised learning algorithm is the clustering algorithm, the reference vibration vectors thus obtained include central vectors which respectively represent a plurality of vibration clusters that are obtained by performing the unsupervised learning algorithm.

In a scenario where the unsupervised learning algorithm is an algorithm of SOM, the reference vibration vectors thus obtained include vectors which respectively correspond to neurons that are obtained by performing the algorithm of SOM and that have been updated for more than a preset number of times.

In step 51, for each of the second training vibration eigenvectors, the processing module 14 of the computer device 1 calculates a plurality of first candidate vibration distances each between the second training vibration eigenvector and a respective one of the reference vibration vectors obtained in step 50. In particular, each of the first candidate vibration distances thus calculated is the Euclidean distance, but is not limited thereto.

In step 52, for each of the second training vibration eigenvectors with the corresponding first candidate vibration distances having been calculated, the processing module 14 of the computer device 1 determines a shortest one of the first candidate vibration distances to serve as a first target vibration distance.

In step 53, the processing module 14 of the computer device 1 obtains, based on the first target vibration distances determined for the second training vibration eigenvectors, a preload assessment range which is utilized in determining whether preload degradation has occurred on the ball screw 4. More specifically, a distribution of the first target vibration distances is regarded as a normal distribution, and a 95% confidence interval (CI) of the distribution of the first target vibration distances serves as the preload assessment range. However, implementation of the preload assessment range is not limited to the disclosure herein and may vary in other embodiments.

Referring to FIG. 1 and FIG. 4, the training procedure of backlash detection includes steps 60 to 63 explained below.

In step 60, the processing module 14 of the computer device 1 uses the first training inertial-force eigenvectors as inputs in machine learning, which is conducted using an unsupervised learning algorithm, so as to obtain reference inertial-force vectors that are in a data space spanned by the first training inertial-force eigenvectors.

In a scenario where the unsupervised learning algorithm is the clustering algorithm, the reference inertial-force vectors thus obtained include central vectors which respectively represent a plurality of inertial-force clusters that are obtained by performing the unsupervised learning algorithm.

In a scenario where the unsupervised learning algorithm is the algorithm of SOM, the reference inertial-force vectors thus obtained include vectors which respectively correspond to neurons that are obtained by performing the algorithm of SOM and that have been updated for more than another preset number of times.

In step 61, for each of the second training inertial-force eigenvectors, the processing module 14 of the computer device 1 calculates a plurality of first candidate inertial-force distances each between the second training inertial-force eigenvector and a respective one of the reference inertial-force vectors obtained in step 60. In particular, each of the first candidate inertial-force distances thus calculated is the Euclidean distance, but is not limited thereto In step 62, for each of the second training inertial-force eigenvectors the first candidate inertial-force distances corresponding to which have been calculated, the processing module 14 of the computer device 1 determines a shortest one of the first candidate inertial-force distances to serve as a first target inertial-force distance.

In step 63, the processing module 14 of the computer device 1 obtains a backlash assessment range based on the first target inertial-force distances determined for the second training inertial-force eigenvectors. More specifically, a distribution of the first target inertial-force distances is regarded as a normal distribution, and a 95% CI of the distribution of the first target inertial-force distances serves as the backlash assessment range. However, implementation of the backlash assessment range is not limited to the disclosure herein and may vary in other embodiments.

Referring to FIG. 1 and FIGS. 5 and 6, the assessment procedure for preload degradation and backlash includes steps 70 to 85 delineated below.

In step 70, the processing module 14 of the computer device 1 obtains an entry of time-domain vibration data based on the vibration signal received from the first sensor 2.

In step 71, the processing module 14 of the computer device 1 obtains at least one entry of frequency-domain vibration derived data based on the entry of time-domain vibration data.

Figure 7:
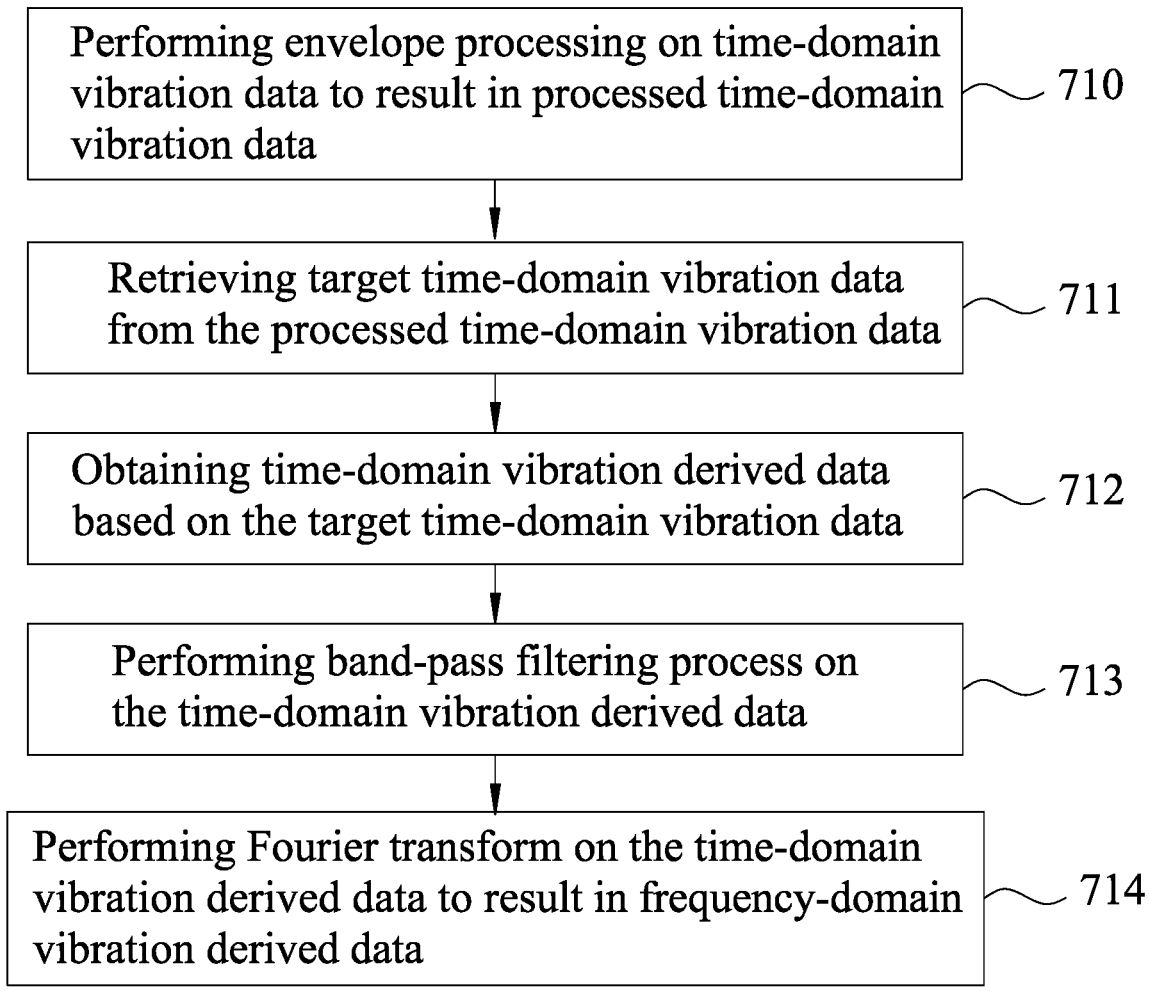
FIG. 7 is a flow chart illustrating an embodiment of sub-steps for obtaining frequency-domain vibration derived data in the method according to the disclosure.

Specifically speaking, step 71 includes sub-steps 710 to 714 as shown in FIG. 7 and delineated below.

In sub-step 710, the processing module 14 of the computer device 1 performs envelope processing on the entry of time-domain vibration data to result in an entry of processed time-domain vibration data. Since implementation of the envelope processing has been well known to one skilled in the relevant art, detailed explanation of the same is omitted herein for the sake of brevity.

In sub-step 711, the processing module 14 of the computer device 1 retrieves, from the entry of processed time-domain vibration data, an entry of target time-domain vibration data that corresponds to a time period within which the nut 41 of the ball screw 4 moves at a constant velocity. It is worth to note that the time period within which the nut 41 of the ball screw 4 moves at the constant velocity can be determined from a preset rotational speed of a motor that drives movement of the ball screw 4.

In sub-step 712, the processing module 14 of the computer device 1 obtains at least one entry of time-domain vibration derived data based on the entry of target time-domain vibration data.

It is worth to note that when the at least one entry of time-domain vibration derived data is plural in number, the plural entries of time-domain vibration derived data should respectively correspond to time periods that have an identical preset time length.

When a length of a time period to which the entry of target time-domain vibration data corresponds is longer than the preset time length, the processing module 14 divides the entry of target time-domain vibration data into the plural entries of time-domain vibration derived data such that each of the plural entries of time-domain vibration derived data corresponds to a time period that has the preset time length.

On the other hand, when the length of the time period to which the entry of target time-domain vibration data corresponds is shorter than the preset time length, the processing module 14 combines multiple entries of target time-domain vibration data to form one of the plural entries of time-domain vibration derived data, such that the plural entries of time-domain vibration derived data respectively correspond to time periods that have the identical preset time length. It should be noted that when a total length of the time periods to which the multiple entries of target time-domain vibration data to be combined correspond is longer than the preset time length, the one of the plural entries of time-domain vibration derived data thus formed will be clipped to have the preset time length.

In sub-step 713, for each of the at least one entry of time-domain vibration derived data, the processing module 14 of the computer device 1 performs a band-pass filtering process on the entry of time-domain vibration derived data. It should be noted that performance of the band-pass filtering process aims at keeping a part of the entry of time-domain vibration derived data that falls in a frequency range within ten times the bandwidth of the spin frequency of the screw shaft 42 while attenuating the remaining part of the entry of time-domain vibration derived data. That is to say, when a frequency range detectable by the first sensor 2 is exactly ten times the bandwidth of the spin frequency of the screw shaft 42, performance of the band-pass filtering process in step 713 may be omitted, and the procedure flow of the method directly proceeds to sub-step 714 after sub-step 712.

In sub-step 714, for each of the at least one entry of time-domain vibration derived data that has undergone the band-pass filtering process, the processing module 14 of the computer device 1 performs a Fourier transform on the entry of time-domain vibration derived data to result in the entry of frequency-domain vibration derived data.

In step 72, for each of the at least one entry of frequency-domain vibration derived data, the processing module 14 of the computer device 1 obtains a vibration eigenvector based on the entry of frequency-domain vibration derived data.

Each of the vibration eigenvector(s) includes one of a kurtosis eigenvector that indicates kurtosis of the entry of frequency-domain vibration derived data, a maximum-peak-value eigenvector that indicates a maximum peak value of the entry of frequency-domain vibration derived data, a total-energy eigenvector that indicates total energy of the entry of frequency-domain vibration derived data, and any combination thereof. It should be noted that component(s) of the vibration eigenvector(s) is/are not limited to the disclosure herein and may vary in other embodiments.

Next, the processing module 14 of the computer device 1 performs preload assessment, which is described in steps 73 to 75, based on the vibration eigenvector(s) obtained in step 72, the reference vibration vectors obtained in step 50 and the preload assessment range obtained in step 53, so as to obtain a result of the preload assessment.

In step 73, for each of the vibration eigenvector(s), the processing module 14 of the computer device 1 calculates a plurality of second candidate vibration distances each between the vibration eigenvector and a respective one of the reference vibration vectors.

In step 74, for each of the vibration eigenvector(s) the second candidate vibration distances corresponding to which have been calculated, the processing module 14 of the computer device 1 determines a shortest one of the second candidate vibration distances to serve as a second target vibration distance.

In step 75, the processing module 14 of the computer device 1 obtains the result of the preload assessment based on the preload assessment range and the second target vibration distance(s) determined for the vibration eigenvector(s).

In one embodiment, the processing module 14 of the computer device 1 calculates a mean of the second target vibration distance(s) to obtain a vibration mean, and then determines whether the vibration mean falls within the preload assessment range so as to obtain the result of the preload assessment (e.g., the vibration mean falls within or outside the preload assessment range).

In one embodiment, the processing module 14 of the computer device 1 determines a mode of the second target vibration distance(s) to obtain a vibration mode, and then determines whether the vibration mode falls within the preload assessment range so as to obtain the result of the preload assessment (e.g., the vibration mode falls within or outside the preload assessment range).

It should be noted that implementation of the preload assessment is not limited to the disclosure herein and may vary in other embodiments.

In step 76, based on the result of the preload assessment, the processing module 14 of the computer device 1 determines whether preload degradation has occurred on the ball screw 4. When it is determined that preload degradation has not occurred on the ball screw 4 (e.g., the vibration mean falls within the preload assessment range), the procedure flow of the method proceeds to step 77. Otherwise, when it is determined that preload degradation has occurred on the ball screw 4 (e.g., the vibration mean falls outside the preload assessment range), the procedure flow of the method proceeds to step 78.

In step 77, the processing module 14 of the computer device 1 generates a first message indicating that preload degradation has not occurred on the ball screw 4, and controls the display module 13 to display the first message.

In step 78, when it is determined that preload degradation has occurred on the ball screw 4, the processing module 14 of the computer device 1 obtains at least one entry of time-domain inertial-force data based on the inertial-force signal received from the second sensor 3.

It is worth to note that each of the at least one entry of time-domain inertial-force data corresponds to a roundtrip period within which the nut 41 of the ball screw 4 moves on the screw shaft 42 from a start position to an end position and then from the end position back to the start position. In one embodiment, each of the at least one entry of time-domain inertial-force data only corresponds to an acceleration (or a deceleration) sub-period of the roundtrip period when the nut 41 is accelerated (or decelerated) during movement.

In step 79, for each of the at least one entry of time-domain inertial-force data, the processing module 14 of the computer device 1 obtains an inertial-force eigenvector based on the entry of time-domain inertial-force data.

Each of the inertial-force eigenvector(s) includes one of a peak-to-peak eigenvector that indicates a peak-to-peak value of the entry of time-domain inertial-force data, a maximum-peak-value eigenvector that indicates a maximum peak value of the entry of time-domain inertial-force data, an average-peak-value eigenvector that indicates an average peak value, which is an average of an absolute value of a positive maximum peak value and an absolute value of a negative minimum peak value of the entry of time-domain inertial-force data, and any combination thereof.

Figure 8:
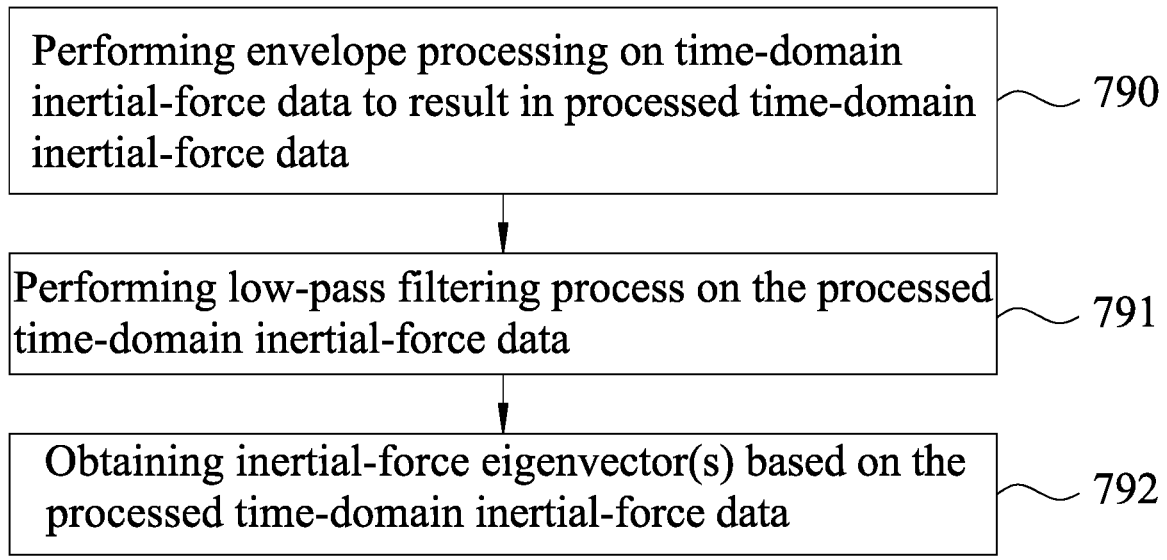
FIG. 8 is a flow chart illustrating an embodiment of sub-steps for obtaining an inertial-force eigenvector in the method according to the disclosure.

Specifically speaking, referring to FIG. 8, step 79 includes sub-steps 790 to 792 delineated below.

In sub-step 790, for each of the at least one entry of time-domain inertial-force data, the processing module 14 of the computer device 1 performs the envelope processing on the entry of time-domain inertial-force data to result in an entry of processed time-domain inertial-force data In sub-step 791, for each of the at least one entry of processed time-domain inertial-force data obtained respectively from the at least one entry of time-domain inertial-force data, the processing module 14 of the computer device 1 performs a low-pass filtering process on the entry of processed time-domain inertial-force data.

It should be noted that performance of the low-pass filtering process aims at keeping a part of the entry of processed time-domain inertial-force data that falls in a frequency range ranging from 0.1 Hz to 5 Hz while attenuating the remaining part of the entry of processed time-domain inertial-force data. That is to say, when a frequency range detectable by the second sensor 3 is exactly the frequency range ranging from 0.1 Hz to 5 Hz, performance of the low-pass filtering process in step 791 may be omitted, and the procedure flow of the method directly proceeds to sub-step 792 after sub-step 790.

In sub-step 792, for each of the at least one entry of processed time-domain inertial-force data that has undergone the low pass filtering process, the processing module 14 of the computer device 1 obtains the inertial-force eigenvector based on the entry of time-domain inertial-force data.

Next, the processing module 14 of the computer device 1 performs backlash assessment, which will be described in steps 80 to 82, based on the inertial-force eigenvector(s) obtained in step 79, a plurality of reference inertial-force vectors obtained in step 60, and the backlash assessment range obtained in step 63, so as to obtain a result of the backlash assessment.

In step 80, for each of the inertial-force eigenvector(s), the processing module 14 of the computer device 1 calculates a plurality of second candidate inertial-force distances each between the inertial-force eigenvector and a respective one of the reference inertial-force vectors.

In step 81, for each of the inertial-force eigenvector(s) with the corresponding second candidate inertial-force distances having been calculated, the processing module 14 of the computer device 1 determines a shortest one of the second candidate inertial-force distances to serve as a second target inertial-force distance.

In step 82, the processing module 14 of the computer device 1 obtains the result of the backlash assessment based on the second target inertial-force distance(s) and the backlash assessment range.

In one embodiment, the processing module 14 of the computer device 1 calculates a mean of the second target inertial-force distance(s) to obtain an inertial-force mean, and then determines whether the inertial-force mean falls within the backlash assessment range so as to obtain the result of the backlash assessment (e.g., the inertial-force mean falls within or outside the backlash assessment range).

In one embodiment, the processing module 14 of the computer device 1 determines a mode of the second target inertial-force distance(s) to obtain an inertial-force mode, and then determines whether the inertial-force mode falls within the backlash assessment range so as to obtain the result of the backlash assessment (e.g., the inertial-force mode falls within or outside the backlash assessment range).

It should be noted that implementation of performance of the backlash assessment is not limited to the disclosure herein and may vary in other embodiments.

In step 83, based on the result of the backlash assessment, the processing module 14 of the computer device 1 determines whether backlash has occurred on the ball screw 4. When it is determined that backlash has not occurred on the ball screw 4 (e.g., the inertial-force mean falls inside the backlash assessment range), the procedure flow of the method proceeds to step 84. Otherwise, when it is determined that backlash has occurred on the ball screw 4 (e.g., the inertial-force mean falls outside the backlash assessment range), the procedure flow of the method proceeds to step 85.

In step 84, the processing module 14 of the computer device 1 generates a second message indicating that preload degradation has occurred on the ball screw 4 but backlash has not occurred on the ball screw 4, and controls the display module 13 to display the second message.

In step 85, the processing module 14 of the computer device 1 generates a third message indicating that backlash has occurred on the ball screw 4, and controls the display module 13 to display the third message.

To sum up, the method for assessing preload degradation of a ball screw according to the disclosure utilizes the computer device 1 to perform the preload assessment at least based on the vibration eigenvector(s); the computer device 1 further performs the backlash assessment at least based on the inertial-force eigenvector(s). Each of the vibration eigenvector(s) is obtained from the vibration signal which is generated by the first sensor 2 mounted adjacent to the return mechanism 43 of the ball screw 4 and which is related to vibrations of the balls 44 of the ball screw 4, and each of the inertial-force eigenvector(s) is obtained from the inertial-force signal which is generated by the second sensor 3 mounted on the nut 41 of the ball screw 4 and which is related to the inertial force exerted on the nut 41. Thereafter, the computer device 1 determines whether preload degradation has occurred on the ball screw 4 based on the result of the preload assessment and whether backlash has occurred on the ball screw 4 based on the result of the backlash assessment.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for assessing preload degradation of a ball screw, the method to be implemented by a computer device, the ball screw including a nut, a plurality of balls, and a return mechanism for recirculating the plurality of balls, the computer device being in signal connection with a first sensor that is mounted on the nut, that is adjacent to the return mechanism, and that periodically transmits to the computer device a vibration signal which is related to vibrations of the plurality of balls in the return mechanism, the method comprising:
    A) obtaining an entry of time-domain vibration data based on the vibration signal received from the first sensor;
    B) obtaining at least one entry of frequency-domain vibration derived data based on the entry of time-domain vibration data;
    C) for each of the at least one entry of frequency-domain vibration derived data, obtaining a vibration eigenvector based on the entry of frequency-domain vibration derived data;
    D) performing preload assessment based on a plurality of reference vibration vectors, a preload assessment range, and the vibration eigenvector(s) obtained for the at least one entry of frequency-domain vibration derived data, so as to obtain a result of the preload assessment; and
    E) determining whether the preload degradation has occurred on the ball screw based on the result of the preload assessment.

2. The method as claimed in claim 1, wherein step B) includes sub-steps of:
    B-1) performing envelope processing on the entry of time-domain vibration data to result in an entry of processed time-domain vibration data;
    B-2) from the entry of processed time-domain vibration data, retrieving an entry of target time-domain vibration data that corresponds to a time period within which the nut of the ball screw moves at a constant velocity; and
    B-3) obtaining the at least one entry of frequency-domain vibration derived data based on the entry of target time-domain vibration data.

3. The method as claimed in claim 2, wherein sub-step B-3) includes sub-steps of:
    B-3-1) obtaining at least one entry of time-domain vibration derived data based on the entry of target time-domain vibration data; and B-3-2) for each of the at least one entry of time-domain vibration derived data, performing a Fourier transform on the entry of time-domain vibration derived data to result in the at least one entry of frequency-domain vibration derived data.

4. The method as claimed in claim 1, wherein in step C), each of the vibration eigenvector(s) includes at least one of a kurtosis eigenvector that indicates kurtosis of the entry of frequency-domain vibration derived data, a maximum-peak-value eigenvector that indicates a maximum peak value of the entry of frequency-domain vibration derived data, and a total-energy eigenvector that indicates total energy of the entry of frequency-domain vibration derived data.

5. The method as claimed in claim 1, wherein the computer device stores a plurality of first training vibration eigenvectors and a plurality of second training vibration eigenvectors, said method further comprising, prior to step D), steps of:
F) using the plurality of first training vibration eigenvectors as inputs in machine learning, which is conducted using an unsupervised learning algorithm, so as to obtain the plurality of reference vibration vectors that are in a data space spanned by the plurality of first training vibration eigenvectors; and
G) obtaining the preload assessment range based on the plurality of reference vibration vectors and the plurality of second training vibration eigenvectors.

6. The method as claimed in claim 5, wherein in step F):
the unsupervised learning algorithm includes a clustering algorithm; and
the plurality of reference vibration vectors include central vectors which respectively represent a plurality of vibration clusters that are obtained by performing the unsupervised learning algorithm.

7. The method as claimed in claim 5, wherein in step F):
the unsupervised learning algorithm includes an algorithm of self-organizing map (SOM); and
the plurality of reference vibration vectors include vectors which respectively correspond to neurons that are obtained by performing the algorithm of SOM and that have been updated for more than a preset number of times.

8. The method as claimed in claim 5, wherein step G) includes sub-steps of:
G-1) for each of the plurality of second training vibration eigenvectors, calculating a plurality of first candidate vibration distances each between the second training vibration eigenvector and a respective one of the plurality of reference vibration vectors obtained in step F);
G-2) for each of the plurality of second training vibration eigenvectors, determining a shortest one of the plurality of first candidate vibration distances calculated for the second training vibration eigenvector to serve as a first target vibration distance; and
G-3) obtaining the preload assessment range based on the first target vibration distances determined for the plurality of second training vibration eigenvectors.

9. The method as claimed in claim 1, wherein step D) includes sub-steps of:
D-1) for each of the vibration eigenvector(s), calculating a plurality of second candidate vibration distances each between the vibration eigenvector and a respective one of the plurality of reference vibration vectors;
D-2) for each of the vibration eigenvector(s), determining a shortest one of the plurality of second candidate vibration distances calculated for the vibration eigenvector to serve as a second target vibration distance; and
D-3) obtaining the result of the preload assessment based on the preload assessment range and the second target vibration distances determined for the vibration eigenvector(s).

10. The method as claimed in claim 1, wherein the ball screw further includes a screw shaft, the computer device being further in signal connection with a second sensor that is mounted on the nut, and that periodically transmits to the computer device an inertial-force signal which is related to an inertial force exerted on the nut along a direction in which the nut is being moved relative to the screw shaft, the method further comprising, subsequent to step E), steps of:
H) obtaining at least one entry of time-domain inertial-force data based on the inertial-force signal received from the second sensor when it is determined that the preload degradation has occurred on the ball screw;
I) for each of the at least one entry of time-domain inertial-force data, obtaining an inertial-force eigenvector based on the entry of time-domain inertial-force data;
J) performing backlash assessment based on a plurality of reference inertial-force vectors, a backlash assessment range, and the inertial-force eigenvector(s) obtained for the at least one entry of time-domain inertial-force data, so as to obtain a result of the backlash assessment; and
K) determining whether backlash occurs on the ball screw based on the result of the backlash assessment.

* * * * *